United States Patent [19]

Kleczkowski

[11] 4,208,683

[45] Jun. 17, 1980

[54] FRUSTO-CONICAL MAGNETIC RECORDING DISC

[75] Inventor: Stawomir P. Kleczkowski, Boulder, Colo.

[73] Assignee: International Business Machines Corporation, Armonk, N.Y.

[21] Appl. No.: 969,137

[22] Filed: Dec. 13, 1978

[51] Int. Cl.$^2$ .................... G11B 5/016; G11B 5/82
[52] U.S. Cl. ................................ 360/99; 360/135
[58] Field of Search ..................... 360/135, 99, 98

[56] References Cited

U.S. PATENT DOCUMENTS

| | | | |
|---|---|---|---|
| 3,090,626 | 5/1963 | Wandy | 360/98 |
| 3,863,266 | 1/1975 | Moshino | 360/99 |
| 4,019,204 | 4/1977 | Griffiths et al. | 360/99 |

OTHER PUBLICATIONS

Wanek, "Controlled Slope Flexible Disk Pack", IBM Tech. Disc. Bull., vol. 19, No. 12, May 1977, p. 4717.
Kheczkowski et al., "Disk Selection in a Stack of Stabilized Flexible Disks", IBM Tech. Disc. Bull., vol. 20, No. 3, pp. 914–915, Aug. 1977.

*Primary Examiner*—Robert S. Tupper
*Attorney, Agent, or Firm*—J. Jancin, Jr.; Michael J. Weins

[57] ABSTRACT

An object of the invention is to provide a flexible disc having a frusto-conical recording surface. The disc is bistable allowing access to both sides, and is well suited for data storage in computer and data processing systems. It may be used either singularly or collectively in disc packs.

9 Claims, 3 Drawing Figures

U.S. Patent
Jun. 17, 1980
4,208,683
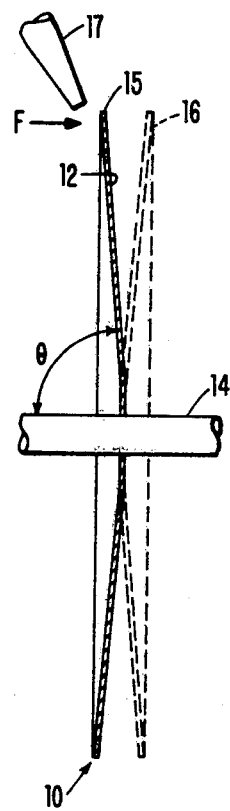
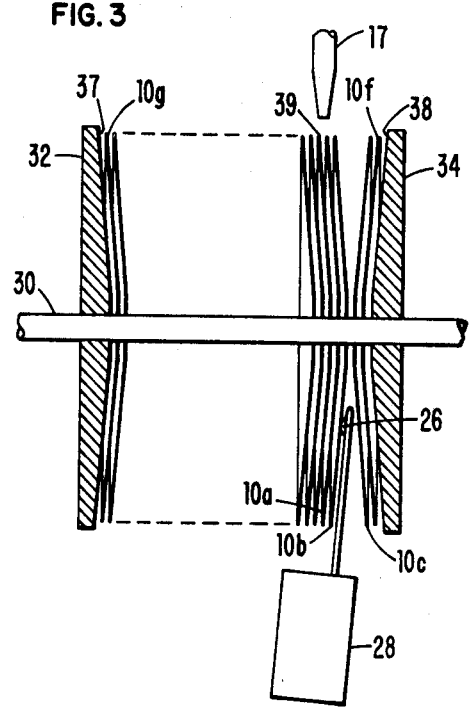
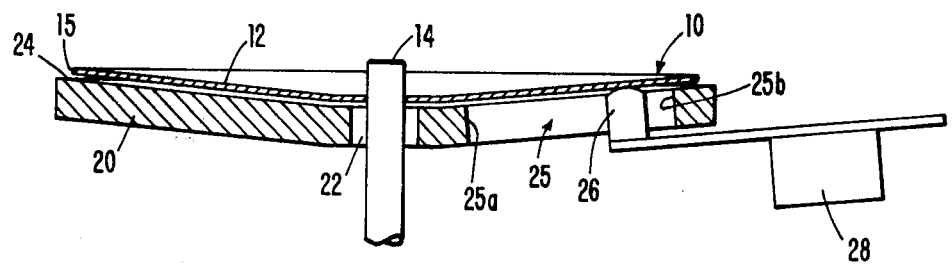

FRUSTO-CONICAL MAGNETIC RECORDING DISC

DESCRIPTION

TECHNICAL FIELD

This invention relates to a data storage device and more particularly to a flexible disc for data storage which has two nonplanar stable configurations.

BACKGROUND ART

It is generally recognized that magnetic recording discs provide relatively economical means for storing data and are in data processing systems. The discs in current use are frequently flexible. A flexible disc is preferable over a rigid disc in that it is less expensive to produce. The flexible discs currently in use are flat. This configuration may cause problems.

Briefly stated, the problem with a flat flexible disc is that when it is rotated about an axis, the outer region of the disc may be destabilized by any perturbation in the air flow. Since the disc by its very nature is flexible, the destabilized section of the disc will tend to flutter. The flutter in turn makes it impossible to maintain the tolerances needed for reliable recording and retrieving of data.

The problem of flutter has been addressed by Hoshina in U.S. Pat. No. 3,863,266 in which he teaches that a flat disc may be stablized by supplying constant air pressure to the underside of the disc. To maintain constant air pressure on the underside of the disc a backing plate is used. This backing plate is so configured that the spacing between the backing plate and the disc decreases as one moves from the center to the periphery of the disc. Air flows from the center to the periphery of the disc. A constant air pressure is maintained on the disc by compensating for the decrease in the radial flow by decreasing the separation between the backing plate and the disc. While this attempt at a solution allows one to stabilize a single flat disc, it will not provide for the stabilization of a series of stacked discs since each disc must be immediately adjacent to a backing plate. Furthermore, this stabilization technique allows information to be retrieved from only one side of the disc. To access the second side of the disc will require remounting of the disc.

Ewert et al in U.S. Pat. No. 3,830,506 teach the stabilization of a flexible disc by employing a curved backing plate. The backing plate induces curvature into the disc and this curvature tends to stabilize the disc. However, as in the case of Hoshino, this solution is limited to the stabilization of a single disc and furthermore the design does not readily lend itself to retrieving information from both sides of a disc.

While Hoshino and Ewert et al have addressed the problem of stabilization of a single flexible disc, they do not treat the more complex problem of stabilizing a disc while maintaining the ability to store and access information from a series of stacked discs. Wadey in U.S. Pat. No. 3,090,626 teaches the use of a bistable disc support means that will allow data to be stored and retrieved from either side of a series of stacked rigid flat discs. However, to practice the teaching of Wadey, the discs must be rigid for the following reasons. First the disc must be rigid to transmit the force applied normal to the edge of the disc to the support means; the transmitted force changes the position of the aforementioned bistable support means and allows access to an adjacent disc. Second the disc must be rigid so that its edge will not flutter during rotation. Flutter as was mentioned earlier will make the outer portion of the disc unacceptable for storing and retrieving information.

While the prior art has offered several partial solutions to the problems of stabilizing and accessing magnetic discs, there is a continuing need for an inexpensive, self-stabilizing flexible magnetic disc suitable for use in single disc applications as well as in disc packs.

OBJECT AND DISCLOSURE OF INVENTION

The principal object of the invention is to provide an improved data storage device.

Another object of the invention is to provide a flexible disc with sufficient dynamic rigidity to avoid flutter of the outer edge.

Still another object of the invention is to provide a series of stacked bistable flexible discs where individual discs in the series of stacked discs can be readily accessed.

One embodiment of this invention is a rotatable magnetic disc which consists of a circular sheet of magnetically coated flexible material having a frusto-conical recording profile. The disc when rotated about its axis is biased in a first stable frusto-conical configuration. The profile of the disc is so constructed that the disc may be destabilized from its first frusto-conical configuration and pass through a series of metastable positions before assuming a second stable frusto-conical configuration.

When a single disc is used preferably it is further stabilized by Bernoulli plates having a common axis with the disc and a concave surface contoured to conform to the frusto-conical profile of the disc.

BRIEF DESCRIPTION OF DRAWINGS

FIG. 1 is a diagrammatic illustration of a rotatable magnetic disc configured in accordance with the present invention.

FIG. 2 illustrates a single disc application in a rotatable magnetic disc data storage device.

FIG. 3 is a diagrammatic illustration of a disc pack employing the discs of the present invention.

BEST MODE FOR CARRYING OUT THE INVENTION

Referring to FIG. 1, the magnetic disc 10 is shown in the first stable configuration. The disc is formed of a flexible material such as milar and has a frusto-conical recording profile 12. The disc is mounted on and rotates about a central shaft 14. When the disc is rotated about the central shaft 14, it is biased in a first stable configuration that is symmetrically disposed with respect to this central shaft 14.

The above described disc 10 is superior to the prior art discs because it is self-stabilized. This self-stabilization avoids flutter of the outer edge 15 of the disc 10. In other words, when the disc 10 rotates, its outer edge 15 is accelerated away from the shaft 14 creating a centrifical force which is balanced by compression forces caused by hoop stresses in the outer regions of the frusto-conical profile 12. These balanced forces bias the disc in its first stable configuration thereby reducing the tendency of the disc to flutter. When a force which has the component F parallel to the axis of rotation (see FIG. 1), is applied to disc 10, the force causes the disc to take on a second stable configuration 16 as is illustrated by the broken lines in FIG. 1. Some means must be provided to apply the force F depicted in FIG. 1. One such means is shown in FIG. 1 and consists of a nozzle 17 that will direct a stream of air onto the disc 10 to produce a component of force F parallel to the central shaft 14.

The two bistable configurations are both frusto-conical profiles and are mirror images of each other. The preferred geometry of the disc is such that the angle $\theta$ between the frusto-conical profile 12 and the axis of rotation 14 is between about 86° and 89.5° when the disc 10 is in its first stable configuration 10 and between about 90.5° to 94° when the disc is in its second stable configuration 16. If the angle becomes too small the energy of the bistable positions will not be sufficiently different from the energy of intermediate positions to avoid flutter of the disc. If, on the other hand, the angle becomes too large then the force required to cause the disc to move to the second bistable position will be excessive.

The thickness of the disc should be between about 0.001 inches and 0.003 inches. The flexible disc 10 is coated with a magnetic material. The thickness of the magnetic coating is preferably between 0.001 inches and 0.0003 inches. It has been found that if the thickness of the magnetic material is too large, it has a tendency to crack and spall; on the other hand, if the coating is too thin it will not have a sufficient remembrance state to record the data. Thus, for optimal service, the aforementioned 0.0001 inches to 0.0003 inches thicknesses range is recommended.

The above-mentioned preferred geometries are for a disc which is designed for an operational speed of from about 1500 rpm to about 2400 rpm. It should be appreciated that all the above variables are interrelated and that the optimal operating conditions will be a function of all the variables.

The disc of the present invention may be used either singularly, or collectively in a disc pack. FIG. 2 illustrates the use of a single disc 10 which is given additional stability by an air cushion formed between the disc 10 and a Bernoulli plate 20. The Bernoulli plate 20 has a central hole 22 for the passage of the shaft 14 which supports the disc 10. The Bernoulli plate 20 has a concave surface 24 which conforms to the frusto-conical profile 12 of the disc 10. Bernoulli plate 20 has a slot 25 which extends radially away from the central hole 22 between limits 25a and 25b. A magnetic head 26 passes through the slot 25 and is moved by an actuator 28 along the frusto-conical profile 12 of the disc 10 in a radial direction that parallels the path of the frusto-conical surface 12 of the disc 10. Since the recording surface is frusto-conical, a linear path for the magnetic head 26 will maintain a constant pressure between the magnetic head 26 and the recording surface 12 thereby assuring proper recording and retrieval of data. As will be clear to one skilled in the art, the head 26 could be relocated above the disc 10 and brought into contact with the other side of the disc 10 which is removed from the plate 20. This would eliminate the necessity of the slot 25.

When the disc is rotated around the central axis of the shaft 14, air is drawn through the hole 22 and flows radially away from the shaft 14. Since the space between the disc 10 and the Bernoulli plate 20 is uniform throughout, the pressure decreases with distances from the axis of rotation. This pressure reduction further stabilizes the disc 10.

The above described flexible disc 10 can be used in disc packs as illustrated in FIG. 3. A plurality of discs 10 are uniformly spaced apart and mounted on a common rotatable shaft 30. The mounting arrangement for the discs 10 on the shaft 30 is conventional and is more particularly described in U.S. Pat. No. 4,019,204 issued to Gibbons et al on an application filed Nov. 19, 1975, and assigned to the assignee of the present application.

When adjacent discs are in the first bistable configuration they are parallel (e.g., discs 10a and 10b). In this case the spacing between the discs is insufficient to insert a recording head 26 (see FIG. 3). However, when adjacent discs are in an alternate bistable configuration (e.g., discs 10b and 10c) there is ample room between discs to allow the insertion of a recording head 26.

Additional support for the discs can be obtained by providing a first end plate 32 and a second end plate 34 which are attached to shaft 30. These plates have surfaces which are generally convex with respect to the discs 10 and are configured to conform to a stable disc configuration. However, one skilled in the art may appreciate that regions of the disc surfaces 37 and 38 may be modified to adjust the complant support afforded to the discs 10f and 10g immediately adjacent to the end plates 32 and 34, respectively, thereby eliminating the number of buffer discs which are conventionally needed to provide complaint support.

Recording information on a selected surface (e.g., 39) can be accomplished by retracting magnetic head 26 with actuator 28. Thereafter a destabilizing force F may be applied by a conventional disc splitting means, such as nozzle 17. Details of splitting means are more particularly described in U.S. Pat. No. 4,019,204 and in an article entitled "Disk Selection in a Stack Stabilized Flexible Disks" by S. P. Kleczkowski and D. E. Norton, and IBM Technical Disclosure Bulletin, Vol. 20, No. 3, pp 914–5 (Aug. 1977). The force generated by the splitting means causes the disc 10a to become dynamically unstable and flip to the opposite stable position. Disc 10a in turn will destabilize disc 10b closing the prior opening in the disc pack. The head 26 may then be positioned on surface 39 and information can be either recorded thereon or read therefrom.

The stability of an opening in a disc pack employing frusto-conical discs results from the discs' geometry and is not sensitive to the air flow between the discs as is the case with prior art flat flexible disc packs such as those disclosed in U.S. Pat. No. 4,019,204. In the case of flat disc packs, it is necessary to first close the existing opening before a new opening can be made. This two-step process is required to maintain the proper air flow.

The use of frusto-conical discs eliminates the necessity of closing the existing opening before a new opening is made. The ability to make a new opening in a single step significantly reduces the access time.

INDUSTRIAL APPLICABILITY

This inventive disc is well suited to and easily adaptable for computer and data processing systems. The disc will provide an inexpensive yet highly reliable method for storing, recording and accessing information.

While the novel features of the invention have been described in terms of preferred embodiments and for a particular industrial application, it will be understood that various omissions and substitutions in the form and detail of the devices illustrated or other applications may be made by those skilled in the art without departing from the spirit of the invention.

I claim:

1. A data storage disc comprising a circular sheet of magnetically coated flexible material having a frusto-conical recording profile.

2. The disc of claim 1 wherein said disc when biased by rotating about a central axis assumes a first stable frusto-conical configuration, and wherein said frusto-conical configuration forms an angle with said central shaft of between about 86° and 89.5°.

3. The disc of claim 2 wherein said disc assumes a second stable frusto-conical configuration when a force parallel to the axis of rotation of said disc is applied to the surface of the disc, and wherein said frusto-conical configuration forms an angle with said central shaft of between about 90.5° and 94°.

4. The disc of claim 3 wherein the thickness of said disc is between about 0.001 inches to 0.003 inches.

5. The disc of claim 4 wherein said disc has a magnetic coating the thickness of which is between about 0.0001 inches and 0.0003 inches.

6. A data recording system comprising: at least one bistable flexible magnetically coated disc having a central passage therethrough, said disc when rotated being normally biased in a first stable configuration having a frusto-conical recording profile; rotatable mounting means to which said disc is attached; means for rotating said disc; a read/write head; and means for moving said head along a path which parallels said frusto-conical profile while said disc is rotating.

7. The data recording system of claim 6 further comprising: a Bernoulli plate,
    said Bernoulli plate being contoured to provide a surface concave with respect to said disc to thereby follow the aforesaid profile of said disc when in its first stable configuration.

8. The data recording system of claim 6 further comprising at least a second bistable flexible magnetically coated disc, said second disc being mounted on said mounting means and being spaced apart from said first disc; a first end plate having a central passage through which said mounting means passes, said first end plate having a surface which is convex with respect to said disc, a second end plate having a central passage through which said mounting means passes, said second end plate having a surface which is convex with respect to said disc and said first end plate; and means for selectively placing a single pair of adjacent discs in alternate bistable configuration so as to increase the spacing between the selected pair of adjacent discs, whereby said read/write head may be inserted into the spacing between the discs for disc selection.

9. The data recording system of claim 8 wherein said last named means includes a nozzle for directing an air stream between the selected pair of adjacent discs for disc selection.

* * * * *